United States Patent
Huberman et al.

(10) Patent No.: US 10,145,689 B1
(45) Date of Patent: *Dec. 4, 2018

(54) METHOD AND SYSTEM OF PEDESTRIAN LOCALIZATION

(71) Applicant: MAPSTED CORP., Mississauga OT (CA)

(72) Inventors: Sean Huberman, Guelph (CA); Majid Bavand, Toronto (CA); Paramvir Singh Nagpal, Markham (CA)

(73) Assignee: MAPSTED CORP., Mississaugia, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 15/910,080

(22) Filed: Mar. 2, 2018

(51) Int. Cl.
*G01C 21/20* (2006.01)
*G06F 12/0862* (2016.01)
*H04W 4/029* (2018.01)
*G06K 9/00* (2006.01)

(52) U.S. Cl.
CPC ....... *G01C 21/206* (2013.01); *G06F 12/0862* (2013.01); *G06K 9/00087* (2013.01); *H04W 4/029* (2018.02); *G06F 2212/1008* (2013.01); *G06F 2212/1021* (2013.01); *G06F 2212/602* (2013.01)

(58) Field of Classification Search
CPC ... G01C 21/206; G01C 21/04; G06F 12/0862; G06F 2212/1008; G06F 2212/602; G06K 9/00087; H04W 4/029; H04W 64/006; H04W 24/08; H04W 4/80; H04W 4/024
See application file for complete search history.

(56) References Cited

U.S. PATENT DOCUMENTS

| 8,473,241 B2 | 6/2013 | Foxlin |
| 8,538,688 B2 | 9/2013 | Prehofer |
| 8,942,725 B2 * | 1/2015 | Marti ............ G01S 5/0252 455/456.1 |

(Continued)

OTHER PUBLICATIONS

King et al., Distribution of Fingerprints for 802.11-Based Positioning Systems, 2007, IEEE, p. 224-226 (Year: 2007).*

(Continued)

*Primary Examiner* — McDieunel Marc
(74) *Attorney, Agent, or Firm* — Henry L. Ohab

(57) ABSTRACT

A method and system localizing a mobile device along a pedestrian route traversed in an indoor area, the mobile device including a processor and a memory. The method executed in the processor and comprises localizing the mobile device to an estimated first position within the indoor area based on accessing, from a first memory tier of the memory, a first portion fingerprint data that includes fingerprint data of a first subset area of the indoor area, the first subset area at least partly surrounding the estimated first position, detecting a traversal of the mobile device along the route to an estimated second position within the indoor area, and when a difference between the estimated first and second positions exceeds a threshold distance, replacing the first portion fingerprint data of the first memory tier upon prefetching a second portion fingerprint data, the second portion fingerprint data including fingerprint data of a second subset area of the indoor area, the second subset area at least partly surrounding the estimated second position.

18 Claims, 4 Drawing Sheets

(56) References Cited

U.S. PATENT DOCUMENTS

| | | | | |
|---|---|---|---|---|
| 8,977,298 | B2* | 3/2015 | Marti | G01S 5/0252 |
| | | | | 370/328 |
| 9,071,937 | B2* | 6/2015 | Marti | G01S 5/0252 |
| 2009/0043504 | A1 | 2/2009 | Bandyopadhyay et al. | |
| 2009/0189810 | A1* | 7/2009 | Murray | G01S 19/48 |
| | | | | 342/357.31 |
| 2013/0036452 | A1* | 2/2013 | Yamashita | G06F 21/31 |
| | | | | 726/3 |
| 2013/0065604 | A1* | 3/2013 | Werner | G01S 5/0263 |
| | | | | 455/456.1 |
| 2013/0331131 | A1* | 12/2013 | Fix | H04W 4/029 |
| | | | | 455/457 |
| 2014/0018095 | A1 | 1/2014 | Parvizi et al. | |
| 2014/0141796 | A1* | 5/2014 | Marti | G01S 5/0252 |
| | | | | 455/456.1 |
| 2014/0171114 | A1* | 6/2014 | Marti | G01C 21/10 |
| | | | | 455/456.2 |
| 2015/0348117 | A1 | 12/2015 | Busch | |
| 2017/0150476 | A1* | 5/2017 | Fix | H04W 4/90 |

OTHER PUBLICATIONS

Li et al., TuRF: Fast data collection for fingerprint-based indoor localization, 2017, IEEE, p. 1-8 (Year: 2017).*

Pavel et al., A Survey of Selected Indoor Positioning Methods for Smartphones, 2016, IEEE, p. 1347-1370 (Year: 2016).*

Wagner et al., An Approach for Hybrid Indoor Outdoor Navigation, 2017, IEEE, p. 36-43 (Year: 2017).*

Li et al., Indoor Localization for Sparse Wireless Networks with Heterogeneous Information, 2015, IEEE, p. 200-204 (Year: 2015).*

Marcus et al., A Pipeline architecture for indoor locaiton tracking, 2016, IEEE, p. 1-8 (Year: 2016).*

Park et al., Smartphone based hybrid localization method to improve an accuracy on indoor navigation, 2014, IEEE, p. 705-708 (Year: 2014).*

Dong et al., Implementation of indoor fingerpring posiitoning based on ZigBee, 2017, IEEE, p. 2654-2659 (Year: 2017).*

* cited by examiner

400

Localizing the mobile device to an estimated first position within the indoor area based on accessing, from a first memory tier of the memory, a first portion fingerprint data that includes fingerprint data of a first subset area of the indoor area, the first subset area at least partly surrounding the estimated first position
410

Detecting a traversal of the mobile device along a route to an estimated second position within the indoor area
420

When a difference between the estimated first and second positions exceeds a threshold distance, replacing the first portion fingerprint data of the first memory tier upon pre-fetching a second portion fingerprint data, the second portion fingerprint data including fingerprint data of a second subset area of the indoor area, the second subset area at least partly surrounding the estimated second position
430

METHOD AND SYSTEM OF PEDESTRIAN LOCALIZATION

TECHNICAL FIELD

The disclosure herein relates to the field of mobile device indoor navigation and localization.

BACKGROUND

Users of mobile devices are increasingly using and depending upon indoor positioning and navigation applications and features. Seamless, accurate and dependable indoor positioning of a mobile device carried or worn by a user can be difficult to achieve using satellite-based navigation systems when the latter becomes unavailable, or only sporadically available and therefore unreliable, such as within enclosed, or partially enclosed, urban infrastructure and buildings, including hospitals, shopping malls, airports, university campuses and industrial warehouses. Pedestrian navigation or positioning solutions may rely on sensors including accelerometers, gyroscopes, and magnetometers that may be commonly included in mobile phones and other mobile computing devices, in conjunction with acquired wireless communication signal data and magnetic field data to localize a pedestrian user in possession of such a mobile device.

BRIEF DESCRIPTION OF THE DRAWINGS

FIG. 4 illustrates an example embodiment of a method of fingerprint data pre-fetch in localizing a mobile device.

DETAILED DESCRIPTION

Figure 1:
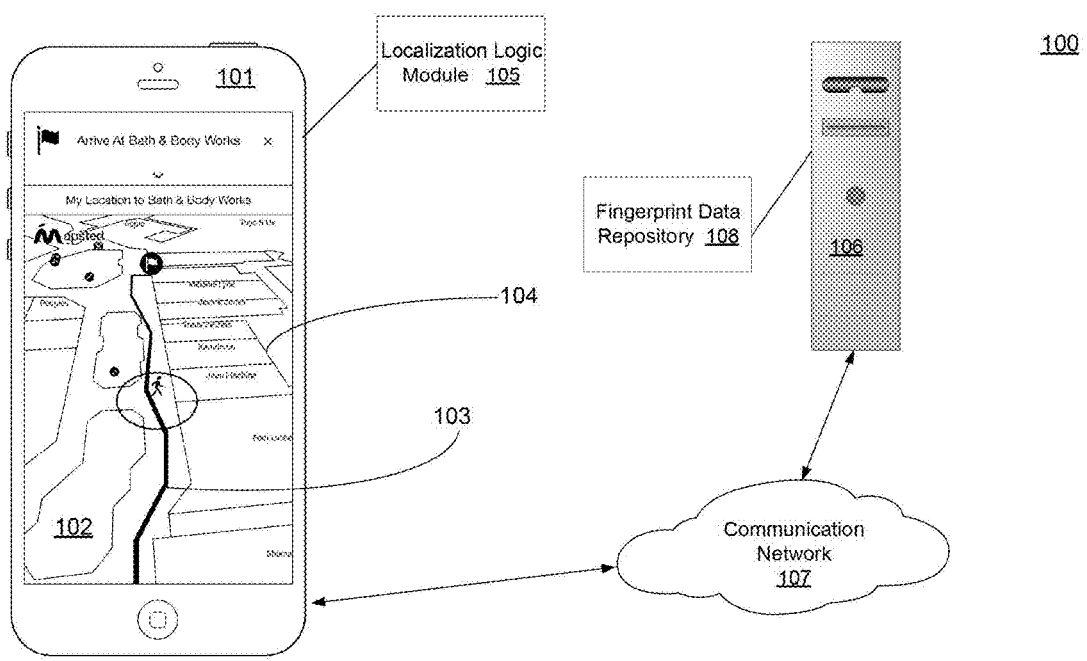
FIG. 1 illustrates, in an example embodiment, a system for localization of a mobile device.

Among other advantages and technical effects, embodiments herein provide for localizing a mobile device along a pedestrian route based on fingerprint-mapped data of an indoor facility by pre-fetching portions of fingerprint map data in accordance with hierarchically-assigned memory resource portions, or memory tiers as referred to herein, in a manner that improves functioning of the mobile device to achieve faster localization. Embodiments herein recognize that comprehensive fingerprint data of an entire facility, or even individual floors of a facility, may consume significant memory and processing resources, and adversely affect processing latency and mobile device responsiveness, given the relatively limited memory and processor resources of the mobile device.

The terms localize, or localization, as used herein refer to determining a unique coordinate position of the mobile device at a specific location along a pedestrian route being traversed relative to the indoor area or building. In some embodiments, localization may also include determining a floor within the building, and thus involve determining not only horizontal planar (x, y) coordinates, but also include a vertical, or z, coordinate of the mobile device. In other embodiments, the (x, y, z) coordinates may be expressed either in a local reference frame specific to the mobile device, or in accordance with a global coordinate reference frame. The term pedestrian as used herein is intended not encompass not only walking pedestrians, but also users of mobile phones moving at typical pedestrian speeds, for example at less than 10 miles per hour using automated means, including but not limited to automated wheelchairs or automated people-moving indoor carts.

In one variation, a location landmark, including but not limited to an elevator, an escalator, a stairwell, having a fixed or known position may be correlated with a unique fingerprint or signature that enables localization of mobile device 101 at a unique position at a given floor within the indoor area or facility, for example. In one embodiment, a magnetic landmark having a pattern of predetermined magnetic characteristics may be deployed at a particular location or local venue constituting the landmark. The equipment or device(s) constituting the magnetic landmark may be specially selected or configured to induce particular predetermined magnetic characteristics unique to that landmark, such as an elevator or escalator, and its position or location of deployment. The particular magnetic characteristics associated with a given magnetic landmark thus established may be recorded, again as part of a magnetic fingerprint calibration process for instance, stored as a magnetic signature unique to that magnetic landmark, and used to localize a mobile device as associated with the location or position of deployment of the magnetic landmark. In one embodiment, the equipment constituting the magnetic landmark may be specially selected and configured based on a proclivity for inducing and establishing magnetic characteristics, such as magnetic field magnitude, dip angle and orientation, in a manner that is relatively controllable, stable, repeatable, and persistent over time.

Among other benefits and technical effects, embodiments herein provide a method and system for localizing a mobile device along a pedestrian route traversed in an indoor area, the mobile device including a processor and a memory. The memory may be configured according to hierarchical memory portions, or memory tiers. The method is executed in the processor and comprises localizing the mobile device to an estimated first position within the indoor area based on accessing, from a first memory tier of the memory, a first portion fingerprint data that includes fingerprint data of a first subset area of the indoor area, the first subset area at least partly surrounding the estimated first position. Next, detecting a traversal of the mobile device along the pedestrian route to an estimated second position within the indoor area. When a difference between the estimated first and second positions exceeds a threshold distance, replacing the first portion fingerprint data of the first memory tier upon pre-fetching a second portion fingerprint data, the second portion fingerprint data including fingerprint data of a second subset area of the indoor area, the second subset area at least partly surrounding the estimated second position.

Also provided is a system for localizing a mobile device within an indoor area. The system comprises a processor and a memory storing a set of instructions. The instructions are executable in the processor to localize the mobile device to an estimated first position within the indoor area based on accessing, from a first memory tier of the memory, a first portion fingerprint data that includes fingerprint data of a first subset area of the indoor area, the first subset area at least partly surrounding the estimated first position. Next, upon detecting a traversal of the mobile device along the route to an estimated second position within the indoor area, when a difference between the estimated first and second positions exceeds a threshold distance, replace the first portion fingerprint data of the first memory tier upon prefetching a second portion fingerprint data, the second portion fingerprint data including fingerprint data of a second subset area of the indoor area, the second subset area at least partly surrounding the estimated second position.

One or more embodiments described herein provide that methods, techniques, and actions performed by a computing device are performed programmatically, or as a computer-implemented method. Programmatically, as used herein, means through the use of code or computer-executable instructions. These instructions can be stored in one or more memory resources of the computing device. A programmatically performed step may or may not be automatic.

One or more embodiments described herein can be implemented using programmatic modules, engines, or components. A programmatic module, engine, or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

A mobile device as described herein may be implemented, in whole or in part, on mobile computing devices such as cellular or smartphones, laptop computers, wearable computer devices, and tablet devices. Memory, processing, and network resources may all be used in connection with the use and performance of embodiments described herein, including with the performance of any method or with the implementation of any system.

Furthermore, one or more embodiments described herein may be implemented through the use of logic instructions that are executable by one or more processors. These instructions may be carried on a computer-readable medium. In particular, machines shown with embodiments herein include processor(s) and various forms of memory for storing data and instructions. Examples of computer-readable mediums and computer storage mediums include portable memory storage units, and flash memory (such as carried on smartphones). A mobile device as described herein utilizes processors, memory, and logic instructions stored on computer-readable medium. Embodiments described herein may be implemented in the form of computer processor-executable logic instructions or programs stored on computer memory mediums.

System Description

FIG. 1 illustrates, in an example embodiment, system 100 for localization of mobile device 101. Mobile device 101 may be such as a cellular or smartphone, a laptop or a tablet computer, or a wearable computer device that may be operational for any one or more of telephony, data communication, and data computing. Mobile device 101 may be connected within a computer network system, such as communication system 107 including the internet or other wide area network, to one or more remote server computing device(s) 106. While remote server computing device 106 as depicted includes fingerprint data repository 108, it is contemplated that, in alternate embodiments, mobile device 101 may include one or more portions of data and processor-executable instructions stored in fingerprint data repository 108 that are downloadable and accessible, at least in part, to a memory of mobile device 101 via communication network 107.

A pedestrian navigation, or indoor positioning, software application downloaded and installed, or stored, in a memory of mobile device 101 may render physical layout map 102 of a facility or building within a user interface display of mobile device 101. In one embodiment, the pedestrian navigation software application may incorporate one or more portions of processor-executable instructions manifesting localization logic module 105. The terms localize, or localization, as used herein means to determine a specific coordinate position (x, y, z) along pedestrian route or trajectory 103 being traversed in accompaniment of mobile device 101, ideally within an indoor positioning accuracy of around one meter or better. The terms indoor facility, indoor area, or building as used herein means an at least partially enclosed building having at least one fixed boundary, such as an exterior boundary wall. Display of physical layout map 102 may further show trajectory or pedestrian route 103 traversed by a user in possession of mobile device 101, which may include an estimated trajectory segment predicted or anticipated for traversal by mobile device 101. Physical layout map 102 may further depict one or more map constraint fixed features 104, such as an internal wall or other map constraint feature including a doorway, a facility exit, a physical marker fixed in place, a facility entrance, a stairwell, a stairway, an escalator, a corridor, an elevator, and an external boundary outline of the indoor facility. In some embodiments, map constraint features 104 may constitute partitions between separate local venues, such as commercial stores, depicted in physical layout map 102 of the indoor building.

Mobile device 101 may include sensor functionality by way of sensor devices. The sensor devices may include inertial sensors such as an accelerometer and a gyroscope, and magnetometer or other magnetic field sensing functionality, barometric or other ambient pressure sensing functionality, humidity sensor, thermometer, and ambient lighting sensors such as to detect ambient lighting intensity. Mobile device 101 may also include capability for detecting and communicatively accessing ambient wireless communication signals including but not limited to any of Bluetooth and Bluetooth Low Energy (BLE), Wi-Fi, RFID, and also satellite-based navigations signals including global positioning system (GPS) signals. Mobile device 101 further includes the capability for detecting, via sensor devices, and measuring a received signal strength, and of determining signal connectivity parameters, related to the ambient wireless signals. In particular, mobile device 101 may include location determination capability such as by way of a GPS module having a GPS receiver, and a communication interface for communicatively coupling to communication network 107, including by sending and receiving cellular data over data and voice channels.

Fingerprint data repository 108, or any portion(s) thereof, may be stored in remote computing server device 106, and made communicatively accessible to mobile device 101 via communication network 107. In some embodiments, it is contemplated that fingerprint data repository 108, or any portions of data and processor-executable instructions constituting fingerprint data repository 108, may be downloaded for storage, at least temporarily, within a memory of mobile device 101. In embodiments, the fingerprint map data stored in fingerprint data repository 108 further associates particular positions along pedestrian route 103 with any combination of fingerprint data, including gyroscope data, accelerometer data, wireless signal strength data, wireless connectivity data, magnetic data, barometric data, acoustic data, line-of sight data, and ambient lighting data stored thereon.

The terms fingerprint and fingerprint data as used herein refer to time-correlated, individual measurements of any of, or any combination of, received wireless communication signal strength and signal connectivity parameters, magnetic field parameters (strength, direction) or barometric pressure parameters, and mobile device inertial sensor data at known, particular locations along a route being traversed, and also anticipated for traversal, by the mobile device. In other words, a fingerprint as referred to herein may include a correlation of sensor and signal information (including, but not necessarily limited to wireless signal strength, wireless connectivity information, magnetic or barometric information, inertial sensor information and GPS location information) associated for a unique location relative to the facility. Thus, fingerprint data associated with a particular location or position may provide a fingerprint signature that uniquely correlates to that particular location or position. A sequence of positions or locations that constitute a navigation path traversed by the mobile device relative to a given indoor facility may be fingerprint-mapped during a calibration process, and the resulting fingerprint map stored in fingerprint data repository 108. Fingerprint data module 108 of server 106 may store respective fingerprint maps of various buildings and indoor areas. The respective building or indoor facility fingerprint maps, or any portions thereof, may be downloaded into a memory of mobile device 101 for use in conjunction with the pedestrian navigation software application executing thereon.

A particular fingerprint or signature based on any of received wireless communication signal strength and signal connectivity parameters, magnetic field parameters or barometric pressure parameters, and mobile device inertial sensor data may be detected or recorded by mobile device 101, whereupon the fingerprint or signature as detected may be matched to a reference fingerprint, or a reference pattern including a set of fingerprints, in a stored fingerprint map of a given facility made accessible to localization logic module 105 to identify a unique position of mobile device 101 along pedestrian route 103. As used herein, term signal connectivity, as distinguished from signal strength, refers to a wireless radio frequency (RF) signal being available for use in bi-directional data communication, such as between devices that both transmit and receive data using that available wireless RF signal. In some embodiments, given that sampling times and sampling rates applied in conjunction with particular mobile device sensors may be different, the signal and sensor information as measured during the fingerprint calibration process may be time-averaged across particular periods of time, with the time-averaged value being used to represent the signal information at any given instance of time within that particular period of time in which the signal information is time-averaged. Fingerprint data may be used to track traversal of mobile device 101 along a sequence of positions that constitute pedestrian route 103 within, and even adjoining, the indoor facility.

Localization logic module 105, constituted of logic instructions executable in a processor of mobile device 101 in one embodiment, may be hosted at mobile device 101 and provides, at least in part, capability for system localizing a mobile device along pedestrian route 103 traversed in an indoor area. In alternate embodiments, one or more portions constituting localization logic module 105 may be hosted remotely at a server device and made communicatively accessible to mobile device 101 via communication network 107.

Figure 2:
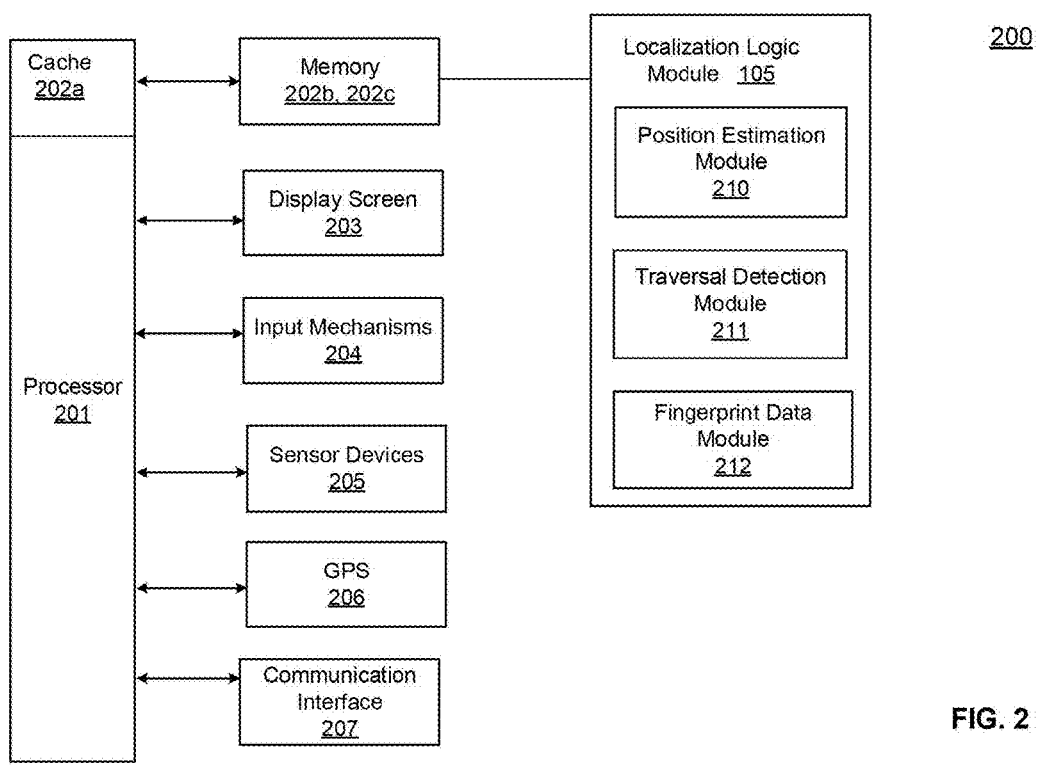
FIG. 2 illustrates, in one example embodiment, an architecture of a mobile device used in a localization system.

FIG. 2 illustrates, in one example embodiment, an architecture of mobile device 101 used in localization system 100. Mobile device 101 may include processor 201, memory 202, display screen 203, input mechanisms 204 such as a keyboard or software-implemented touchscreen input functionality, barcode, QR code or other symbol- or code-scanner input functionality. In some embodiments, processor 201 as configured includes processor cache memory 202*a*.

Memory 202 of mobile device 101 may be constituted of a random access memory, such as a dynamic or a static random access memory, in one embodiment configured or partitioned into separate memory portions 202*b*, 202*c*. In embodiments, memory 202 of mobile device 101 as referred to herein shall collectively include processor cache memory 202*a*, also referred to herein as cache memory 202*a*, and memory portions 202*b*, 202*c*. In other variations, one or more secondary memory storage components, including flash memory, magnetic disk storage and optical storage devices, may be communicatively coupled to processor 201.

As designated herein, a first tier memory portion, also referred to herein as a first tier memory, is constituted in a hierarchical scheme of mobile device 101 memory in which a memory tier, for example memory 202*b*, is directly accessible by processor 201, as compared with a designated second tier memory 202*c* which may be a random access memory, or a flash memory in some embodiments, constituted in a local database of mobile device 101, but comparatively less directly addressable by processor 201, or addressable but resulting in a higher degree of latency in performance of processor operations. Secondary, external, or auxiliary memory storage may be accessible for transfer of data via input/output channels, and even less directly addressable by processor 201 as compared with memory 202*b* and memory 202*c*, and consequently designated as a lowest memory tier.

Mobile device 101 may include sensor functionality by way of sensor devices 205. Sensor devices 205 may include inertial sensors such as an accelerometer and a gyroscope, and magnetometer or other magnetic field sensing functionality, barometric or other ambient pressure sensing functionality, and ambient lighting sensors, such as to detect ambient lighting intensity. Mobile device 101 may also include capability for detecting and communicatively accessing ambient wireless communication signals including but not limited to any of Bluetooth and Bluetooth Low Energy (BLE), Wi-Fi, RFID, and also satellite-based navigations signals such as, but not limited to, global positioning system (GPS) signals. Mobile device 101 further includes capability for detecting, via sensor devices 205, and measuring a received signal strength, and for determining signal connectivity parameters, related to the ambient wireless signals. In particular, mobile device 101 may include location or position determination capability such as by way of GPS module 206 having a GPS receiver, and communication interface 207 for communicatively coupling to communication network 107, including by sending and receiving cellular data over data and voice channels.

Localization logic module 105 of mobile device 101 includes instructions stored in memory 202 of mobile device 101, executable in processor 201. Localization logic module 105 may comprise sub-modules, or portions thereof, including position estimation module 210, traversal detection module 211 and fingerprint data module 212. In alternate embodiments, it is contemplated that any one or more, or portions, of sub-modules including position estimation module 210, traversal detection module 211 and fingerprint data module 212 may be located at remote server device 106 communicatively accessible to mobile device 101 via communication interface 207. Localization logic module 105 provides, at least in part, capability for detecting a transition of mobile device 101 across an indoor threshold. In one embodiment, the indoor threshold may be a threshold or entrance leading into or out of a local venue, such as a store or business premises, physically partitioned at least in part, within an indoor building.

Processor 201 uses executable instructions of position estimation module 210 to localize mobile device 101 to an estimated first position within the indoor area based on accessing, from first memory tier 202a of mobile device 101 memory, a first portion fingerprint data that includes fingerprint data of a first subset area of the indoor area, the first subset area at least partly surrounding estimated first position.

Processor 201 uses executable instructions stored in traversal detection module 211 to detect movement of mobile device 101 from an estimated first position to an estimated second position in a sequence of positions as localized along pedestrian route 103, using fingerprint data in correlation with any combination of one or more of detected wireless signal, inertial, and magnetic characteristics or signatures.

Processor 201 uses executable instructions stored in fingerprint data module 212 to, when a difference between the estimated first and second positions exceeds a threshold distance, replace the first portion fingerprint data of the first memory tier 202a upon pre-fetching a second portion fingerprint data, the second portion fingerprint data including fingerprint data of a second subset area of the indoor area, the second subset area at least partly surrounding the estimated second position.

Methodology

Figure 3A:
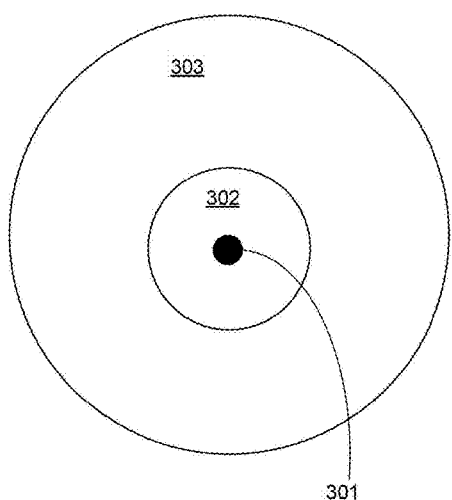
FIG. 3A and FIG. 3B illustrate example embodiments in a fingerprint data pre-fetch scheme for localizing a mobile device.
Figure 3B:
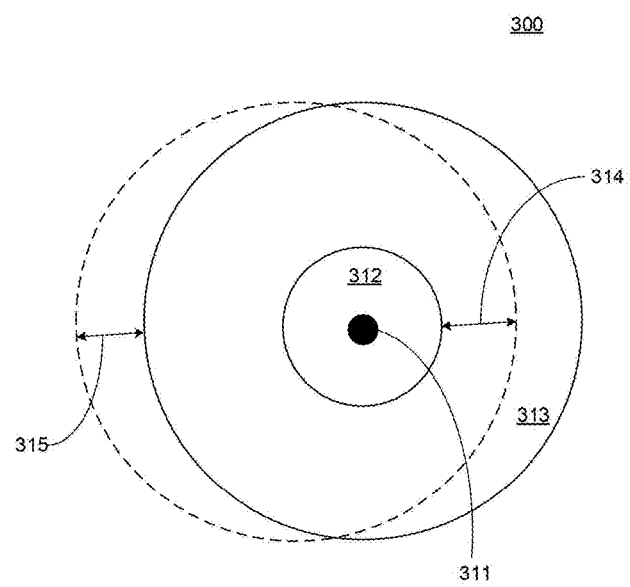

FIGS. 3A-3B illustrates, in an example embodiment, fingerprint data pre-fetch scheme 300 for localizing mobile device 101 during traversal along pedestrian route 103 from estimated first position 301 to estimated second position 311. In describing examples of FIG. 3, reference is made to the examples of FIGS. 1-2 for purposes of illustration. First portion fingerprint data 303 pre-fetched into random access memory portion 202b represents a first subset area 303 of the indoor area at least partly surrounding estimated first position 301, and includes fingerprint data loaded into processor cache memory 202a represented by processing region 302 to localize mobile device 101. As mobile device 101 traverses from estimated first position 301 to estimated first position 311, based on a predetermined threshold distance of traversal, in one embodiment, fingerprint data portion 315 may be released from first tier memory 202b to second tier memory 202c, while fingerprint data region 313 represents a second subset area for new pre-fetch fingerprint data, with fingerprint processing portion 312 loaded into first tier memory portion 202b of mobile device 101. Processor 201 localizes mobile device 101 to estimated second position 311 based on fingerprint data processing region 312 of pre-fetched fingerprint data region 313 generally surrounding estimated second position 311. It is contemplated that the quantity of fingerprint data pre-fetched from second memory tier 202c to first tier memory 202b is generally proportional to and synonymous with a spatial size of a given subset area portion of the indoor area.

FIG. 4 illustrates an example embodiment of method 400 of fingerprint data pre-fetch in localizing mobile device 101. In describing examples of FIG. 4, reference is made to the examples of FIGS. 1-3 for purposes of illustrating suitable components or elements for performing a step or sub-step being described.

Examples of method steps described herein relate to the use of mobile device 101 for implementing the techniques described. According to one embodiment, the techniques are performed by localization logic module 105 of mobile device 101 in response to the processor 201 executing one or more sequences of software logic instructions that constitute localization logic module 105. In embodiments, localization logic module 105 may include the one or more sequences of instructions within sub-modules including position estimation module 210, traversal detection module 211 and fingerprint data module 212. Such instructions may be read into memory 202 from machine-readable medium, such as memory storage devices. In executing the sequences of instructions contained in position estimation module 210, traversal detection module 211 and fingerprint data module 212 of localization logic module 105 in memory 202, processor 201 performs the process steps described herein. In alternative implementations, at least some hard-wired circuitry may be used in place of, or in combination with, the software logic instructions to implement examples described herein. Thus, the examples described herein are not limited to any particular combination of hardware circuitry and software instructions. Additionally, it is contemplated that in alternative embodiments, the techniques herein, or portions thereof, may be distributed between mobile device 101 and server computing device 106. For example, mobile device 101 may collect and transmit data to server 106 that, in turn, performs at least some portion of the techniques described herein.

At step 410, processor 201 executes instructions included in position estimation module 210 to localize mobile device 101 to estimated first position 301 within the indoor area based on accessing, from first memory tier 202a of mobile device 101 memory, a first portion fingerprint data that includes fingerprint data of first subset area 303 of the indoor area, first subset area 303 generally surrounding estimated first position 301.

Mobile device 101 memory may include second memory tier 202, from which second portion fingerprint data 313 may be pre-fetched from second memory tier 202c into first memory tier 202b. First memory tier 202b may be a random access memory, in an embodiment.

Second memory tier 202c may consist of at least one of a random access memory, a flash memory configured in a local database at mobile device 101, or a secondary storage memory communicatively coupled to processor 201, in some embodiments.

First subset area 303 may at least partly surround the estimated first position 301, and further may be arranged generally concentrically surrounding the estimated first position. It is also contemplated that other non-concentric arrangements may be applied in pre-fetching data, such as when considering a direction of user movement at any given position.

The accuracy associated with estimating the position, or location, of a mobile device 101 as a consequence of localization is not absolute, but rather is subject to the statistical, or probabilistic, nature of the fingerprint parameters, including but not limited to the received signal strength of wireless radio frequency signals. In some embodiments, a degree of accuracy associated with the position estimation may be indicated by a confidence level that is determined for, and assigned in conjunction with, estimated first and second positions 301, 311 as localized. As a measure of the accuracy of localization of mobile device 101, the confidence level associated with the location estimate may be obtained by fusing the probabilistic results of multiple concurrent location estimates. In some embodiments, the variance in the x and y components, with respect to their mean values $(\mu_x, \mu_y)$, can be estimated independently as:

$$\sigma_x^2 = \frac{1}{N-1} \sum (x - \mu_x)^2$$

$$\sigma_y^2 = \frac{1}{N-1} \sum (y - \mu_y)^2$$

and combined to produce the confidence level. In one embodiment, the overall confidence level can be selected as a function of the maximum standard deviation of the x-y components, as $\sigma=\max(\sigma_x, \sigma_y)$. In other embodiments, a weighted variance of the x and y, where the weights are based on the probability of each individual estimate can be used to produce the confidence estimate. When multiple trajectory-based location estimates are available, trajectories can be grouped into categories based on similarity and a probability spread/confidence can be assigned on a per-group basis. If the per-group probability/confidence level of one group significantly exceeds that of the other groups, then the confidence in the validity of that group is raised, and hence, the confidence in the fused location estimate increases. Conversely, if several distinct per-group probabilities are similar, then the confidence in the per-group results are reduced, leading to a lower confidence level.

In some embodiments, a respective spatial size of first and second subset areas 303, 313 may be inversely correlated with the determined confidence level associated with estimated first position 301 and estimated second position 312 respectively. In such embodiments, the spatial size of subset areas 303, 313 along with the quantity of fingerprint data inherent therewith may increase as respective confidence levels determined for estimated first and second positions 301, 311 decreases.

At step 411, processor 201 executes instructions included in traversal detection module 211 to detect a traversal of mobile device 101 along pedestrian route 103 from estimated first position 301 to estimated second position 311 within the indoor area.

At step 412, processor 201 executes instructions included in fingerprint data module 212 to, when a difference between the estimated first and second positions exceeds a threshold distance, replace first portion fingerprint data 303 of the first memory tier upon pre-fetching second portion fingerprint data 313, second portion fingerprint data 313 including fingerprint data of second subset area of the indoor area, the second subset area at least partly surrounding estimated second position 311. The replacing may be preceded by releasing the first portion fingerprint data from first memory tier 202b to second memory tier 202c. As the user and accompanying mobile device 101 move, processing regions 302, 312 adjust dynamically accordingly. Similarly, as the user approaches and exceeds the prespecified threshold, a new prefetching region is established, releasing far away data from first tier memory 202b, and in turn, prefetching new data into first memory 202b. In this manner, use of a buffered prefetching region in accordance with the threshold minimizes costly local database queries while enabling responsive real-time processing and performance.

In an alternate embodiment, the replacing may be pre-conditioned on a dynamically determined threshold that is based on the respective spatial sizes of the first and second subset areas.

In one variation, estimated second position 311 of mobile device 101 as localized may coincide with, and represent, a predetermined landmark within the indoor area, such as an elevator or escalator. The second portion fingerprint data 313 may comprise fingerprint data of multiple floor portions of the indoor area serviced by that elevator. The fingerprint data of the multiple floor portions may generally concentrically surround the elevator or landmark as localized. In such vertical pre-fetching embodiment, the fingerprint data of the multiple floor portions surrounding the elevator may be contemporaneously pre-fetched into first memory tier 202b, in anticipation of the user of mobile device 101 being located, or imminently to be located, at any given floor of the multiple floors of the indoor area.

It is contemplated for embodiments described herein to extend to individual elements and concepts described herein, independently of other concepts, ideas or system, as well as for embodiments to include combinations of elements recited anywhere in this application. Although embodiments are described in detail herein with reference to the accompanying drawings, it is to be understood that the invention is not limited to those precise embodiments. As such, many modifications and variations will be apparent to practitioners skilled in this art. Accordingly, it is intended that the scope of the invention be defined by the following claims and their equivalents. Furthermore, it is contemplated that a particular feature described either individually or as part of an embodiment can be combined with other individually described features, or parts of other embodiments, even if the other features and embodiments make no specific mention of the particular combination of features. Thus, the absence of describing combinations should not preclude the inventors from claiming rights to such combinations.

What is claimed is:

1. A method of localizing a mobile device along a pedestrian route traversed in an indoor area, the mobile device including a processor and a memory, the method executed in the processor and comprising:
    localizing the mobile device to an estimated first position within the indoor area based on accessing, from a first memory tier of the memory, a first portion fingerprint data that includes fingerprint data of a first subset area of the indoor area, the first subset area at least partly surrounding the estimated first position, wherein the fingerprint data comprises a plurality of portions, each of the plurality of portions corresponding to a subset area of the indoor area, and wherein the first memory tier includes the first portion of the plurality of portions of the fingerprint data and a second memory tier of the memory includes one or more of remaining portions of the plurality of portions of the fingerprint data;
    detecting a traversal of the mobile device along the route to an estimated second position within the indoor area; and
    when a difference between the estimated first and second positions exceeds a threshold distance, replacing the first portion fingerprint data of the first memory tier upon pre-fetching a second portion fingerprint data from the second memory tier, the second portion fingerprint data including fingerprint data of a second subset area of the indoor area, the second subset area at least partly surrounding the estimated second position.

2. The method of claim 1 wherein the replacing further comprises releasing the first portion fingerprint data from the first memory tier into the second memory tier.

3. The method of claim 1 wherein the first memory tier comprises a first random access memory.

4. The method of claim 1 wherein the second memory tier consists of at least one of a second random access memory and a flash memory communicatively coupled to the processor.

5. The method of claim 1 wherein the first subset area at least partly surrounding the estimated first position is arranged generally concentrically surrounding the estimated first position.

6. The method of claim 1 wherein further comprising assigning a respective confidence level associated with the estimated first and second positions.

7. The method of claim 6 wherein a respective spatial size of the first and the second subset areas increases as the assigned respective confidence level decreases.

8. The method of claim 7 further comprising performing the replacing in accordance with a dynamically determined threshold that is based on the respective spatial size of the first and second subset areas.

9. The method of claim 1 wherein the estimated second position comprises a predetermined landmark within the indoor area, the second portion fingerprint data comprises fingerprint data of multiple floor portions of the indoor area that generally concentrically surround the predetermined landmark, and further comprising pre-fetching the fingerprint data of the multiple floor portions into the first memory tier.

10. A system for localizing a mobile device within an indoor area, the system comprising:
 a processor;
 a memory storing a set of instructions, the instructions executable in the processor to:
  localize the mobile device to an estimated first position within the indoor area based on accessing, from a first memory tier of the memory, a first portion fingerprint data that includes fingerprint data of a first subset area of the indoor area, the first subset area at least partly surrounding the estimated first position, wherein the fingerprint data comprises a plurality of portions, each of the plurality of portions corresponding to a subset area of the indoor area, and wherein the first memory tier includes the first portion of the plurality of portions of the fingerprint data and a second memory tier of the memory includes one or more of remaining portions of the plurality of portions of the fingerprint data;
  detect a traversal of the mobile device along the route to an estimated second position within the indoor area; and
  when a difference between the estimated first and second positions exceeds a threshold distance, replace the first portion fingerprint data of the first memory tier upon pre-fetching a second portion fingerprint data from the second memory tier, the second portion fingerprint data including fingerprint data of a second subset area of the indoor area, the second subset area at least partly surrounding the estimated second position.

11. The system of claim 10 wherein the replacing further comprises releasing the first portion fingerprint data from the first memory tier into the second memory tier.

12. The system of claim 10 wherein the first memory tier comprises a first random access memory.

13. The system of claim 10 wherein the second memory tier consists of at least one of a second random access memory and a flash memory communicatively coupled to the processor.

14. The system of claim 10 wherein the first subset area at least partly surrounding the estimated first position is arranged generally concentrically surrounding the estimated first position.

15. The system of claim 10 wherein comprising assigning a respective confidence level associated with the estimated first and second positions.

16. The system of claim 15 wherein a respective spatial size of the first and the second subset areas increases as the assigned respective confidence level decreases.

17. The system of claim 16 further comprising performing the replacing in accordance with a dynamically determined threshold that is based on the respective spatial size of the first and second subset areas.

18. The system of claim 10 wherein the estimated second position comprises a predetermined landmark within the indoor area, the second portion fingerprint data comprises fingerprint data of multiple floor portions of the indoor area that generally concentrically surround the predetermined landmark, and further comprising pre-fetching the fingerprint data of the multiple floor portions into the first memory tier.

* * * * *